United States Patent [19]

Willis

[11] Patent Number: 4,750,039
[45] Date of Patent: Jun. 7, 1988

[54] CIRCUITRY FOR PROCESSING A FIELD OF VIDEO INFORMATION TO DEVELOP TWO COMPRESSED FIELDS

[75] Inventor: Donald H. Willis, Indianapolis, Ind.

[73] Assignee: RCA Licensing Corporation, Princeton, N.J.

[21] Appl. No.: 917,911

[22] Filed: Oct. 10, 1986

[51] Int. Cl.$^4$ ............................................. H04N 5/262
[52] U.S. Cl. ...................................... 358/183; 358/12; 358/22
[58] Field of Search ...................... 358/183, 22, 11, 12, 358/39, 140, 160

[56] References Cited

U.S. PATENT DOCUMENTS

| | | | |
|---|---|---|---|
| 4,278,993 | 7/1981 | Suzuki | 358/22 |
| 4,298,888 | 11/1981 | Colles et al. | 358/140 |
| 4,298,891 | 11/1981 | Baba et al. | 358/183 |
| 4,322,750 | 3/1982 | Lord et al. | 358/140 |
| 4,574,300 | 3/1986 | Hulyer | 358/11 |
| 4,583,113 | 4/1986 | Pritchard | 358/11 |
| 4,627,333 | 5/1977 | Kaiser et al. | 358/146 |

Primary Examiner—Tommy P. Chin
Attorney, Agent, or Firm—Paul J. Rasmussen; Eric P. Herrmann; Kenneth N. Nigon

[57] ABSTRACT

A picture-within-a-picture television receiver includes circuitry for displaying a reduced-size frozen image developed from an auxiliary signal as an inset in the main image. To develop signals representing two fields of the compressed auxiliary image, the system includes circuitry which processes first and second groups of successive horizontal line intervals of one field of the auxiliary video signal to develop signals representing mutually corresponding horizontal line intervals in two successive fields of the compressed auxiliary video signal.

7 Claims, 3 Drawing Sheets

CIRCUITRY FOR PROCESSING A FIELD OF VIDEO INFORMATION TO DEVELOP TWO COMPRESSED FIELDS

The present invention relates to circuitry for processing one field of video signals to develop two fields, constituting one frame, of signals representing a compressed image.

U.S. patent application Ser. No. 4,652,908 entitled "Filtering System For Producing A Reduced Resolution Video Image", which is hereby incorporated by reference, relates to a television receiver which includes circuitry for displaying an image derived from an auxiliary source as a reduced-size inset in an image derived from a main source. This feature is commonly known as picture-within-a-picture or pix-in-pix. In the system described in the referenced patent application, the auxiliary signal is separated into its luminance and color difference signal components. Each of the components is processed by horizontal and vertical antialiasing filters to reduce distortion in the displayed image which may occur when the signal is subsampled. The signals provided by the horizontal antialiasing filters are subsampled in the horizontal direction using separate subsampling circuitry. Vertical subsampling, however, is performed as a part of the vertical antialiasing filters. The filtered and subsampled signals are stored in an auxiliary field memory as they are produced. These signals are read from the memory, synchronous with the display of the main image so that the auxiliary image may be displayed as a coherent inset in the main image display.

It may be desirable to freeze the inset image, for example, as a part of a television directory display. In a display of this type, still inset images from a relatively large number of different channels (i.e. 9 or 12) are sequentially displayed, allowing the viewer to determine which programs are being carried by the respective channels without having to manually switch the receiver between the various channels. Since the reduced-size still images derived from the various signals may be displayed for a number of field periods, it is desirable to store two fields or one frame of video signal for each of the inset images. A display of this type takes advantage of the interlaced scan in a standard television receiver to retain vertical resolution in the reduced-size image. An image composed of two different field images may have as much as twice the vertical resolution of an image formed by displaying a single field twice.

One method of developing two fields which may be displayed as a single still frame would be to increase the size of the memory used in the referenced patent application so that one frame of video signals is stored at all times. A still image would then be provided by alternately displaying the compressed signals developed from two sequential fields. This method may produce "still" images that seem to vibrate at the field display frequency due to interfield motion between the two stored fields.

SUMMARY OF THE INVENTION

The present invention is embodied in circuitry for generating two distinct fields of samples, representing one frame of a compressed video image, from one field interval of the original video signal. A portion of the circuitry, which is responsive to a first group of samples representing a predetermined number of horizontal line intervals of the original signal, generates samples representing one horizontal line interval of a first field of the compressed image. Another portion of the circuitry is responsive to a second group of samples, representing a predetermined number of horizontal line intervals that are offset from those represented by the first group of samples, and generates samples representing one horizontal line interval of a second field of the compressed image.

DETAILED DESCRIPTION

Figure 1:
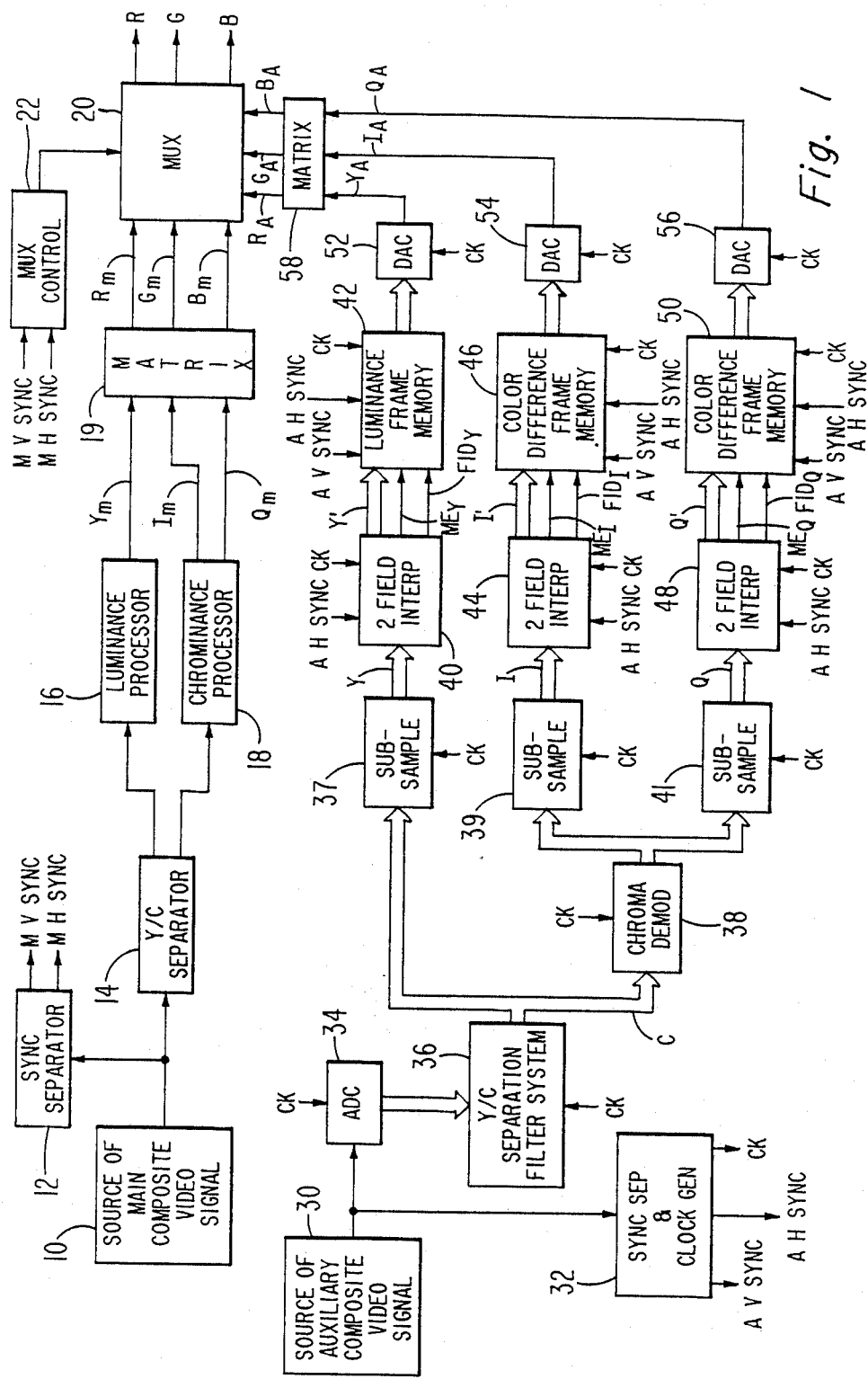
FIG. 1 is a block diagram of a video signal processing system which includes circuitry for providing a frozen image developed from an auxiliary signal as an inset in the main image.

In the drawing, broad arrows represent busses for multiple-bit parallel digital signals. Line arrows represent connections conveying analog signals or single bit digital signals. Depending on the processing speed of the devices, compensating delays may be required in certain of the signal paths. One skilled in the art of digital signal processing circuit design will know where such delays are needed in a particular system.

In the video signal processing system shown in FIG. 1, a source of main composite video signal 10, provides the main video signal to synchronizing signal separation circuitry 12. The circuitry 12 separates the vertical and horizontal synchronizing signal components from the main composite video signals and provides these components as the respective signals MVSYNC and MHSYNC. These signals are used by the circuitry shown in FIG. 1 as set forth below. The signals provided by the source 10 are also applied to luminance/chrominance separation circuitry 14. The circuitry 14, which may, for example, include a comb filter, separates the luminance signal components and chrominance signal components from the main composite video signal. The luminance signal components provided by the separation circuitry 14 are applied to a luminance processor 16 which may, for example, include circuitry for peaking the high frequency luminance components and for adjusting the signal to change the brightness and contrast of the main image. The processed luminance signal, $y_m$, provided by the luminance processor 16 is applied to a conventional matrix 19.

The chrominance signal developed by the separator circuitry 14 is applied to a chrominance processor 18. The processor 18, may, for example separate the chrominance signal into its in-phase ($I_m$) and quadrature phase ($Q_m$) color difference signal components and correct the separated color difference signal components for hue and saturation. The processed color difference signals $I_m$ and $Q_m$ are applied to the matrix circuitry 19. Matrix circuitry 19, which may be of conventional design combines the main luminance signal $Y_m$ and the main color difference signals $I_m$ and $Q_m$ to develop signals $R_m$, $G_m$ and $B_m$ representing the respective red, green and blue primary color signal components of the main image. The signals $R_m$, $G_m$ and $B_m$ are applied to a multiplexer 20, which, under control of the multiplexer control circuitry 22, substitutes auxiliary primary color signal $R_A$, $G_A$ and $B_A$ for the respective main primary color signals $R_m$, $G_m$ and $B_m$ as appropriate, to display the compressed auxiliary image as an inset in the main image on a display device 21. The multiplexer control circuitry 22 is responsive to the signals MVSYNC and MHSYNC provided by the synchronizing signal separation circuitry 12 to substitute the auxiliary primary color signals for the main primary color signals during a predetermined portion of each of a selected group of horizontal line intervals of the main image.

To generate the auxiliary primary color signals, a source of auxiliary composite video signal 30 applies auxiliary video signal to synchronization signal separation and clock signal generating circuitry 32. The circuitry 32 separates the horizontal and vertical synchronizing signal components from the auxiliary video signals and provides these signals as the respective signals AHSYNC and AVSYNC to the video signal processing system as set forth below. The circuitry 32 also includes circuitry which develops a clock signal CK that may, for example, have a frequency of 3fc, three times the frequency, $f_c$, of the color subcarrier signal, and which may be locked in phase to the color synchronizing burst signal component of the auxiliary composite video signal.

The auxiliary composite video signal provided by the source 30 is applied to an analog to digital converter (ADC) 34 which develops digital samples representing the auxiliary video signal at instants determined by the clock signal, CK. The sampled data video signal provided by the ADC 34 is applied to a luminance/chrominance separation filter system, 36. The filter system 36 may, for example, include a low-pass filter for separating the luminance signal components, and a band-pass filter for separating chrominance band signal components from the auxiliary video signal. The low-pass filter may, for example, have a frequency response characteristic passband from 0 to 1 MHz. In this example, the low-pass filter acts as a horizontal antialiasing filter reducing the bandwidth of the frequency spectrum of the luminance signal to be less than the Nyquist limit frequency of the subsampled luminance signal. The band-pass filter used to separate the chrominance band signal components from the auxiliary video signal may, for example, have a frequency characteristic pass-bandwidth of 1 MHz centered about the frequency of the color subcarrier signal. This band-pass filter also acts as an antialiasing filter, since, when the reduced-bandwidth chrominance band signal is demodulated, color difference signals having a bandwidth of 500 KHz will be obtained. These reduced-bandwidth color difference signals may be subsampled by the subsampling circuitry to have a sampling frequency of approximately $f_c$ without introducing aliasing distortion in the reproduced auxiliary image.

The luminance signal provided by the luminance/chrominance separation filter 36 is applied to subsampling circuitry 37 which selects one of every three samples of the luminance signal to provide a signal having a sampling frequency substantially equal to fc.

Figure 2:
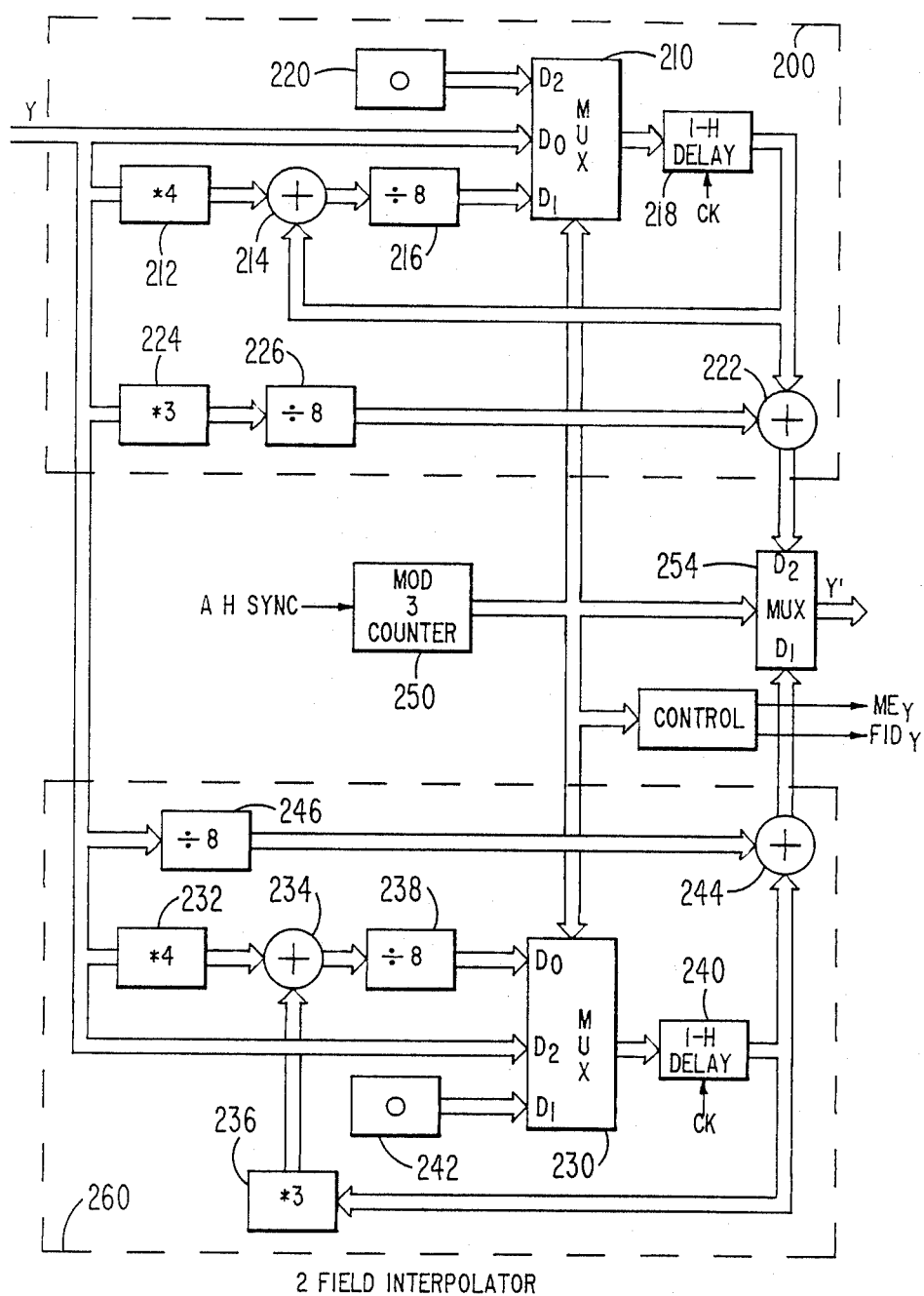
FIG. 2 is a block diagram of a two-field vertical interpolating circuit, incorporating the present invention, which may be used in the video signal processing system shown in FIG. 1.

The subsampled luminance signal is applied to a two-field interpolator 40 which includes an embodiment of the present invention. FIG. 2 is a block diagram of a two-field interpolator suitable for use as the interpolator 40. This two-field interpolator averages successive horizontal line intervals from one field of the subsampled luminance signal to develop samples representing horizontal line intervals of the luminance signal for two successive fields, A and B, of the compressed image. The interpolator includes two circuits 200 and 260, which develop samples for field A and for field B respectively. The samples for both fields are provided via the output signal Y'. The interpolator also provides a memory enable signal, $ME_{Y'}$, and a field identifier signal $FID_{Y'}$, which indicate when the signal Y' conveys valid data and to which field the data belongs, respectively.

In the circuitry 200 of FIG. 2, the subsampled luminance signal, Y, provided by the subsampling circuitry 37, is applied to the input terminal, $D_0$, of the multiplexer 210 and to a sample multiplier 212. The multiplier 212 scales the sample values applied to its input port by a factor of four. The samples provided by the multiplier 212 are applied to one input port of an adder 214. The other input port of the adder 214 is coupled to receive samples from a 1-H delay element 218. The output samples of the adder 214 are applied to a divider 216 which divides the samples applied to its input port by eight. The samples provided by the divider 216 are applied to the input port, $D_1$, of the multiplexer 210. The input port, $D_2$, of the multiplexer 210 is coupled to a constant value source 220 which provides a digital value, for example, zero. The multiplexer 210 is controlled by a modulo 3 counter 250 which counts pulses of the auxiliary horizontal synchronizing signal AHSYNC. When the value provided by the counter is 0, 1 and 2, the multiplexer 210 is conditioned to provide the signals applied to the respective input ports $D_0$, $D_1$, and $D_2$ at its output port. The signal provided by the multiplexer 210 is applied to the 1-H delay element 218. The delay element 218 may be, for example, a shift register having a sufficient number of storage cells to hold one horizontal line interval of the subsampled luminance signal. The delayed signal provided by the delay element 218 is applied to the adder 214, as set forth above, and to one input port of an adder 222. The subsampled luminance signal, Y, is sequentially multiplied by three and divided by eight in the multiplier 224 and divider 226, respectively. The output signal of the divider 226 is applied to the second input port of the adder 222. The signal developed by the adder 222, which is the output signal of the circuitry 200, is applied to the input port, $D_2$, of a multiplexer 254. The multiplexer 254 is conditioned to provide a null value, the signal provided by the circuitry 260, and the signal provided by the circuitry 200 when the value of the signal provided by the counter 250 is 0, 1 and 2, respectively.

In the circuitry 260, the subsampled luminance signal Y is applied to the input terminal, $D_2$, of a multiplexer 230, and to a multiplier 232. The multiplier 232 scales the sample values applied to its input port by a factor of four. The output samples of the multiplier 232 are applied to one input port of an adder 234, the other input port of which is coupled to receive samples from a 1-H delay element 240, scaled by a factor of 3 by the multiplier 236. The samples provided by the adder 234 are applied to a divider 238 which divides the samples by eight and applies the resulting samples to the input port, $D_0$, of the multiplexer 230. The input port, $D_1$, of the multiplexer 230, is coupled to a source of constant value 242 which provides a digital constant value, for example, zero. The multiplexer 230 is conditioned by the counter 250 to couple the samples applied to its $D_0$, $D_1$ and $D_2$ input ports to its output port, when the value of the signal provided by the counter 250 is 0, 1 and 2, respectively. The output port of the multiplexer 230 is coupled to the input port of the 1-H delay element 240. The delay element 240, which may be identical to the delay element 218, contains a sufficient number of storage cells to hold samples representing one horizontal line interval of the subsampled luminance signal, Y. The output port of the 1-H delay element 240 is coupled to the multiplier 236, as set forth above, and to one input port of the adder 244. The other input port of the adder 244 is coupled to receive the subsampled luminance signal, Y, scaled by a factor of one-eighth in the divider 246. The output signal provided by the adder 244, which is the output signal of the circuitry 260, is applied to the input port, $D_1$, of the multiplexer 254.

The signal provided by the modulo 3 counter 250 is also applied to control circuitry 252 which generates the memory enable signal, $ME_Y$, and the field identification signal, $FID_Y$. The memory enable signal, $ME_Y$ is a logic one when the signal provided by the counter 250 has a value of 1 or 2 and is a logic zero when the signal provided by the counter 250 has a value of 0. The signal $FID_Y$ is logic one and logic zero when the signal provided by the counter 250 has a value of 1 and 2, respectively.

The circuitry 200 operates as follows. When the value of the signal provided by the counter 250 is 0, the subsampled luminance signal, Y, is coupled to the 1-H delay element 218 by the multiplexer 210. After one horizontal line period, the counter value changes to 1 and the samples from the delay element 218 are added, to four times the luminance signal, Y, from the next successive line in the adder 214. The resultant samples are divided by eight in the divider 216 and stored in the 1-H delay element 218. During the next successive line interval, the value provided by the counter 250 is 2, and the samples from the 1-H delay element 218, which represent a weighted average of samples from the two previous horizontal line periods, are added to the luminance samples, Y, from the current horizontal line period (scaled by $\frac{3}{8}$) in the adder 222. Assigning the labels L1, L2, and L3 to the three successive line intervals of luminance signal described in the foregoing discussion. The line of samples, $L_A$, provided by the adder 222, when the value of the counter 250 is 2, is described by equation:

$$L_A = (4*L2 + 3*L3 + L1)/8. \tag{1}$$

A similar analysis of the circuitry 260 will show that the line of samples $L_B$, provided by the adder 244 when the output signal of the counter 250 is 1, may be described by the equation:

$$L_B = (4*L4 + 3*L3 + L5)/8 \tag{2}$$

where L4 and L5 are labels assigned to the two successive lines following line L3.

Figure 3:
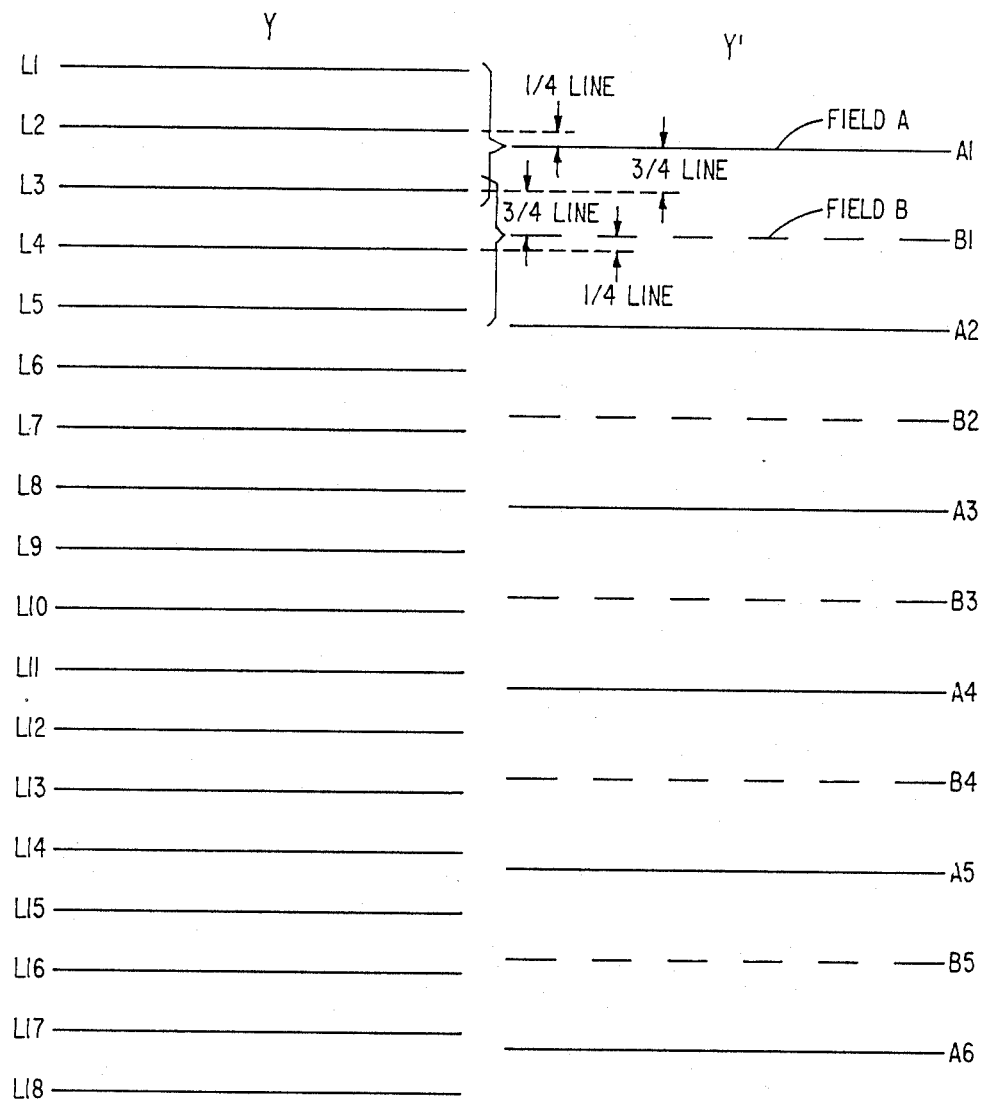
FIG. 3 is a graphical presentation of lines of samples of the original and compressed image signals that is useful for explaining the operation of the present invention.

FIG. 3 is a diagram showing the effective spatial positions of the lines of the interpolated and subsampled luminance signal Y' relative to the lines of the subsampled luminance signal Y. These effective positions are determined by the weighting factors used to develop the interpolated samples. In FIG. 3, the line $A_1$ which corresponds to the line $L_A$ of equation (1), is $\frac{1}{4}$ of a line below line L2 and $\frac{3}{4}$ of a line above line L3. Similarly, line $B_1$, which corresponds to the line $L_B$ of the equation (2) is $\frac{3}{4}$ of a line below line L3 and $\frac{1}{4}$ of a line above L4. This relative spacing is the same spacing that is used when the lines, which are effectively vertically subsampled in a one to three ratio, are displayed in the inset image. In addition to generating lines of luminance samples which are spatially correct in the reproduced image, the circuitry 40 acts as an antialiasing filter (i.e. a vertical low-pass filter) reducing aliasing distortion which may arise from vertical subsampling. The lines of samples are low-pass filtered in the vertical direction since three consecutive lines of input samples are combined in a weighted average to produce one line of output samples.

Referring to FIG. 1, the interpolated and subsampled luminance signal, Y', and the memory enable and field identification signals $ME_Y$ and $FID_Y$ respectively, provided by the two-field interpolator 40 are applied to the luminance frame memory 42. The memory 42 is controlled by the signals $ME_Y$ and $FID_Y$ and by the auxiliary vertical and horizontal synchronization signals AVSYNC and AHSYNC, respectively, to store the samples of the signal Y' only when they are valid ($ME_Y = 1$) and in the appropriate field ($FID_Y = 1$ or 0). The address counter of the memory 42 may, for example, be reset by the signal AVSYNC and incremented by the signal AHSYNC, divided by three, with the signal FID providing the most significant bit of the address value. Operating in this manner, the memory 42 stores the subsampled and interpolated luminance samples, Y', in the proper sequence and in separate fields as they are produced. The memory 42 is also controlled by circuitry (not shown) which reads the samples from the memory for display, synchronous with the main video signal. It will be appreciated by one skilled in the art of designing digital television circuitry that the main video signal used for a multi-picture television directory display may include internally generated synchronizing signals. When the inset image is frozen, the samples representing field A are read and displayed during one field interval of the main video signal and the samples representing field B are read and displayed during the next successive field interval of the main video signal. Thus, the fields A and B of the compressed image are displayed in a normal interlaced manner. This sequence repeats as long as the frozen image is displayed. Since no data are written into the memory while the frozen inset image is displayed, there is no potential for conflict arising from simultaneously attempting to write samples into and read samples from the memory 42.

When the inset image is a moving image, however, a potential for conflict exists and the operations of writing data into and reading data from the memory are desirably synchronized. Circuitry which synchronizes the reading and writing of a memory for a pix-in-pix display system is described in the above referenced patent application Ser. No. 4,652,908 which is incorporated by reference; this circuitry is not described herein.

The samples provided by the memory 42 are applied to a digital-to-analog converter (DAC) 52 which generates an analog signal, $Y_A$, representing the subsampled and interpolated luminance samples of the auxiliary signal. This signal is applied to a matrix 58. The other two input signals applied to the matrix are analog versions of subsampled and interpolated color difference signals $I_A$ and $Q_A$. These signals are developed from the chrominance samples, C, provided by the luminance/chrominance separation filter system 36, by the circuitry described below.

The chrominance samples, C, are applied to a chrominance signal demodulator 38 which may, for example, synchronously demodulate the sampled data chrominance band signals to generate the baseband in-phase, I, and quadrature phase, Q, color difference signals. The signals I and Q are applied to respective subsampling circuits 39 and 41 which subsample the respective color difference signals in a one to three ratio. The samples provided by the respective subsampling circuits 39 and 41 are applied to the two field interpolators 44 and 48 respectively.

Each of the interpolators 44 and 48 may be identical to the interpolator 40, described above, in reference to FIGS. 2 and 3. The operation of the interpolating filters 44 and 48 is the same as described above. However, there is an added benefit to using the interpolation filter as shown in FIG. 2 to process color difference signals. As set forth above, the chrominance signal, C, provided by the luminance/chrominance separation filter system 36 is a chrominance band signal and is therefore not a pure chrominance signal. The signal C may contain luminance signal components which happen to have frequencies within the band of frequencies passed by the chrominance band-pass filter component of the filter system 36. This luminance signal contamination of the chrominance signal is approximately the same in any two successive horizontal line intervals. When the chrominance signals are demodulated the polarity of the contaminating luminance signal reverses from line to line since the phase of the demodulating subcarrier reverses from line to line. Thus, the luminance signal components can be substantially eliminated by averaging successive lines. The weighted averages of three successive lines described by the equations (1) and (2) have approximately the same effect as an unweighted average of two successive lines. Accordingly, the luminance signal contamination of the signals I' and Q' provided by the two-field interpolators 44 and 48 may be substantially less than the luminance signal contamination of the input signals I and Q.

The subsampled and interpolated color difference signal I' and the memory enable and field identification signals $ME_I$ and $FID_I$ provided by the interpolator 44 are applied to the color difference signal frame memory 46. Likewise, the subsampled and interpolated color difference signal Q' and the memory enable and field identification signals $ME_Q$ and $FID_Q$ are applied, by the two field interpolator 48, to the color difference signal frame memory 50. The memories 46 and 50, which may be identical to the luminance signal frame memory 42, described above, store samples representing two successive fields of the color difference signal components of the compressed auxiliary image. The digital signals provided by the memories 46 and 50 are converted to analog signals $I_A$ and $Q_A$ by the DAC's 54 and 56 respectively. The signals I and $Q_A$ are applied to the matrix circuitry 58, as set forth above. The matrix circuitry 58 processes these color difference signals and the luminance signa $Y_A$ to produce the signal $R_A$, $G_A$ and $B_A$, the respective red, green and blue primary color signals that represent the compressed auxiliary image. These signals are substituted for portions of the main primary color signals $R_m$, $G_m$ and $B_m$, to generate the pix-in-pix display on the display device 21.

While the system described herein uses a one-to-three subsampling ratio, it is contemplated that the invention may be practiced in video signal processing circuitry which use other subsampling ratios. For example, if a one-to-four subsampling ratio were used, the averaging circuitry used in the two field interpolator may average a first pair of successive lines of the subsampled signal to generate an interpolated line for the field A and the next pair of successive lines of the subsampled signal to generate the corresponding interpolated line for the field B.

What is claimed is:

1. In a television signal processing system, including circuitry for displaying a compressed image derived from an auxiliary video signal as an inset in an image derived from a main video signal, circuity for generating, from one field of said auxiliary video signal, first and second sampled data signals representing respective first and second fields of said compressed image, comprising:

a source of sampled data auxiliary signal, for providing samples representing said auxiliary video signal, wherein said sampled data auxiliary signal has a horizontal line synchronizing signal component which defines a line interval and a vertical field synchronizing signal component which defines a field interval;

means, responsive to the samples provided by said source of sampled data auxiliary signal during a first group of successive horizontal line intervals, for developing samples constituting one horizontal line interval of said first sampled data signal; and means, responsive to the samples provided by said source of sampled data auxiliary signal during a second group of successive horizontal line intervals, displaced in time from said first group of successive horizontal line intervals by less than one field interval, for developing samples constituting one horizontal line interval of said second sampled data signal.

2. The circuitry set forth in claim 1 wherein the samples in the first horizontal line interval of said first group of successive horizontal line intervals are displaced in time from the corresponding samples in the first horizontal line interval of said second group of successive horizontal line intervals by not more than two horizontal line intervals.

3. The circuitry set forth in claim 2 wherein:

said means for developing samples constituting one horizontal line interval of said first sampled data signal includes:

sample multiplying means for scaling the samples provided by said source of sampled data signal during the respective horizontal line intervals of said first group of successive horizontal line intervals by respective scale factors from a first group of scale factors to produce corresponding scaled samples; and means for combining the corresponding scaled samples of each of the horizontal line intervals of said first group of successive horizontal line intervals to provide the samples constituting the one horizontal line interval of said first sampled data signal; and said means for developing samples constituting one horizontal line interval of said second sampled data signal includes:

sample multiplying means for scaling the samples provided by said source of sampled data signal during the respective horizontal line intervals of said second group of successive horizontal line intervals by respective scale factors from a second group of scale factors to produce corresponding scaled samples; and means for combining the corresponding scaled samples of each of the horizontal line intervals of said second group of successive horizontal line intervals to provide the samples constituting the one horizontal line interval of said second sampled data signal.

4. The circuitry set forth in claim 3 wherein:

the numbers of samples in said respective first and second groups of successive horizontal line intervals of samples are substantially equal; and the scale factors in said first group of scale factor differ from the corresponding scale factors in said second group of scale factors.

5. The circuitry set forth in claim 4 wherein:

said first group of successive horizontal line intervals includes three horizontal line intervals;

said second group of successive horizontal line intervals includes three horizontal line intervals, wherein the samples of the first horizontal line interval of said second group of successive horizontal line intervals is displaced in time by two horizontal line intervals from the corresponding samples in the first horizontal line interval of said first group of successive horizontal line intervals;

the scale factors in said first group of scale factors are one-eighth, one-half and three-eighths, respectively; and the scale factors in said second group of scale factors are three-eighths, one-half, and one-eighth, respectively.

6. In a television signal processing system, including circuitry for developing an output video signal representing a frozen, compressed image derived from one field interval of an input video signal, circuitry for processing the one field interval of said input video signal to generate first and second field intervals of said output video signal, comprising:

a source of sampled data signal, for providing samples representing successive horizontal line intervals of the one field interval of said input video signal;

means, coupled to said source of sampled data signal and responsive to the samples provided thereby during N successive horizontal line intervals, for developing samples representing one horizontal line interval of the first field interval of said output video signal, where N is an integer greater than 1; and means, coupled to said source of sampled data signal and responsive to the samples provided thereby during M successive horizontal line intervals, for developing samples representing one horizontal line interval of the second field of said output video signal, where M is an integer greater than 1.

7. The circuitry set forth in claim 6 wherein:

said means for generating samples representing one horizontal line interval of the first field interval of said output video signal includes:

first sample storage means, coupled to said source of sampled data signal, for storing samples provided thereby representing a first horizontal line interval of said input video signal; and means, coupled to said source of sampled data signal, for combining samples provided thereby representing a second horizontal line interval of said input video signal with respective samples provided by said first sample storage means in a first predetermined proportion; and said means for generating samples representing one horizontal line interval of the second field interval of said output video signal includes:

second sample storage means, coupled to said source of sampled data signal, for storing samples representing a third horizontal line interval of said input video signal; and means, coupled to said source of sampled data signal, for combining samples representing a fourth horizontal line interval of said input video signal with respective samples provided by said second sample storage means in a second predetermined proportion.

* * * * *